March 7, 1939.  A. R. ALLARD  2,149,491
FLUX FOR AUTOMATIC WELDING APPARATUS
Filed Feb. 23, 1938
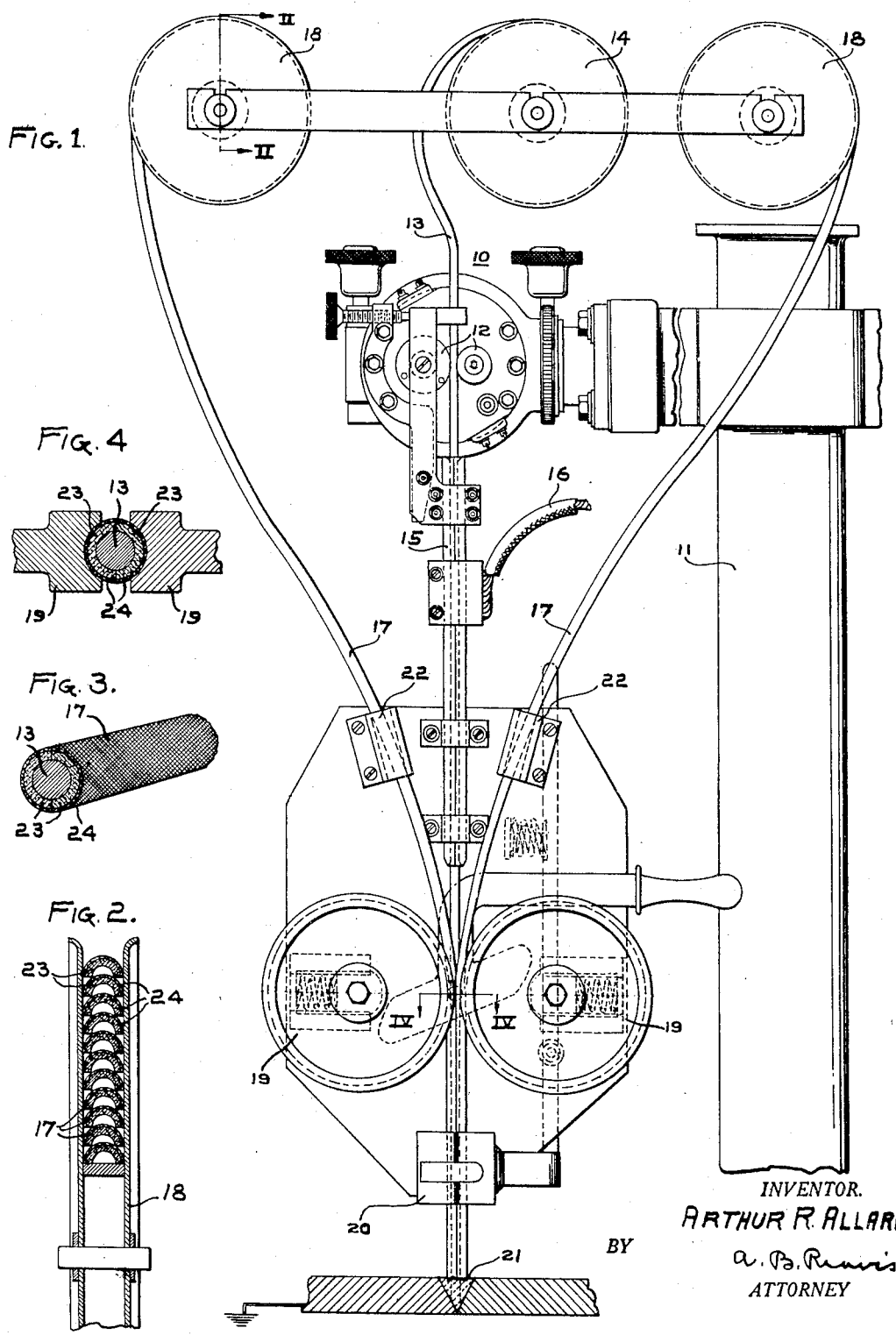
INVENTOR.
ARTHUR R. ALLARD.
BY a. B. Reavis
ATTORNEY Patented Mar. 7, 1939

2,149,491

UNITED STATES PATENT OFFICE 2,149,491

FLUX FOR AUTOMATIC WELDING APPARATUS

Arthur R. Allard, Drexel Hill, Pa., assignor to Westinghouse Electric & Manufacturing Company, East Pittsburgh, Pa., a corporation of Pennsylvania Application February 23, 1938, Serial No. 192,024

3 Claims. (Cl. 219—8)

This application is a continuation in part of my applications Serial No. 74,244, filed April 14, 1936, and Serial No. 74,886, filed April 17, 1936.

The present invention relates to electric welding and it has for an object to provide flux therefor embodied as preformed and substantially non-deformable strip material of arcuate section so that a plurality of strips may be disposed longitudinally of a wire or rod to encompass the latter.

A further object of my invention is to provide welding flux as an article of manufacture embodied in strip form of arcuate section and having sufficient flexibility that a plurality of strips may be progressively applied to a wire or rod to encompass the latter with feeding of the strips toward the wire or rod at a small angle.

A further object of my invention is to provide welding flux embodied as an article of manufacture and comprising a preformed and substantially non-deformable strip of arcuate section with a fabric outer covering.

These and other objects are effected by my invention as will be apparent from the following description and claims taken in accordance with the accompanying drawing, forming a part of this application, in which:

Fig. 1 is an elevational view of an automatic welding head showing the improved flux used thereby;

Fig. 2 is a sectional view taken along the line II—II of Fig. 1;

Fig. 3 is an isometric view showing a pair of flux strips applied to a welding wire or rod; and, Fig. 4 is a fragmentary sectional view taken along the line IV—IV of Fig. 1 and drawn to a larger scale.

My development in electric welding has for its object to combine the advantages of the good electrical contact of the automatic bare rode type of welding head and of flux of the type commonly used with flux-covered rod; and the achievement of this objective has entailed, not only improvements in the automatic welding head, but also the devising of flux embodied as a preformed strip of arcuate section so that a plurality of strips may be applied to the wire or rod progressively as the latter issues from the electrical contact device of the head in order to be in encompassing relation to the wire or rod as the latter approaches the welding location. In my application Serial No. 74,244, aforesaid, there are disclosed and claimed features of the automatic welding head which cooperate with the wire and with the new type of flux, and the present application relates to the flux embodied as an article of manufacture in strip form of arcuate section such that a plurality of such strips may be used with the improved head.

Referring now to Fig. 1, there is shown an automatic welding head, at 10, carried by a suitable support 11. The head has feed rolls 12 for feeding wire or rod 13 from a reel 14, the wire passing through an electrical contact device or nozzle 15 joined to a conductor 16.

As the wire issues from the contact device 15, it is encompassed by a plurality of flux strips 17, the strips being progressively applied and fed toward the wire with feeding movement of the latter. The flux strips 17 are preferably supplied from reels 18 of suitably large radius, the strips being fed into encompassing relation with respect to the wire and pressed against the latter by the presser rolls 19 so that frictional engagement thereof with the wire is sufficient to cause the flux strips to be drawn along with the wire. The head, at 10, is preferably provided with a guide 20 arranged below the presser rolls 19 for holding the flux strips in encompassing relation adjacent to the welding location, at 21.

Each flux strip 17 is of arcuate section so that a plurality thereof disposed longitudinally of a wire or rod may substantially encompass the latter. As the strip has the solid aggregate character of the flux of the usual flux-covered rod and as it is constituted by fluxing and binding ingredients found to be satisfactory with such rod, it is necessary that the ingredients be subject to suitable mixing and treatment to produce a plastic mass which may be formed into a strip of arcuate section, the strip so formed then being subject to further treatment to make it usable as a flux strip and to condition it for welding, the strip being heated or baked for this purpose and, therefore, being rendered substantially non-deformable.

While the flux covering is somewhat brittle, it has a limited degree of transverse flexibility to provide for deflection thereof sufficiently to be rolled on a reel and to be fed toward the wire or rod and then along with the latter. Accordingly, reels of large radius are used and the welding head is constructed and arranged to provide for feeding the strips at a small angle with respect to the wire or rod issuing from the contact device to minimize transverse flexure of the strip. Referring again to Fig. 1, it will be noted that the head, at 10, preferably has guide devices 22 carried thereby and disposed so as to assure feeding of the strips at a suitably small angle.

Each strip 17 preferably embodies a solid aggregate 23 of fluxing and binding ingredients with a fabric covering 24 embodied in its outer convex face, the fabric reenforcing and giving tensile strength to the strip resisting severance or breakage thereof and consequent interruption of welding, serving to distribute the pressure of the presser rolls thereon, thereby minimizing fracture or breakage on account of localized stresses, and, in the event of cracking or breaking of the flux aggregate, holding the parts together so as to serve satisfactorily in the welding operation without interruption of the latter.

From the foregoing, it will be apparent that the flux strip is essential to obtaining both the advantages of good electrical contact of the automatic bare rod type of welding head and of flux which has been found satisfactory with flux-covered rods. Accordingly, the features and operative arrangements of the bare rod type of head have been preserved so far as possible and provision has been made for the feeding of preformed flux strips in connection therewith. Feeding of the strips takes into account both the section thereof and the physical character of fluxing and binding ingredients. Each strip is of arcuate section, that is, it is preferably semi-circular, so that a plurality of strips may be progressively applied to the wire issuing from the contact device so as to encompass substantially the wire. With a flux strip of this character, the radial thickness thereof may be selected to suit the size of wire so as to maintain a desired ratio of wire cross-sectional area to flux annulus area.

It is to be understood the term "wire" as used herein covers any suitable rod or wire material commonly used in electric welding operations. Furthermore, any flux composition commonly used with present types of flux-covered rod may be employed in the manufacture of the strip.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In the art of electric welding with flux-covered wire wherein the flux is applied to the wire issuing from the contact device of an automatic welding head, an article of manufacture comprising flux embodied as a substantially non-deformable and preformed strip of arcuate section so that a plurality of strips disposed longitudinally of a wire may substantially encompass the latter, said strip including fluxing and binding ingredients forming a solid aggregate conditioned for welding use.

2. In the art of electric welding with flux-covered wire wherein the flux is applied to the wire issuing from the contact device of an automatic welding head, an article of manufacture comprising flux embodied as a substantially non-deformable and preformed strip of arcuate section so that a plurality of strips disposed longitudinally of a wire may substantially encompass the latter, said strip including fluxing and binding ingredients forming a solid aggregate conditioned for welding use and the strip being flexible transversely sufficiently so that it may be applied progressively along a wire with feeding of the strip at a small angle toward the latter.

3. In the art of electric welding with flux-covered wire wherein the flux is applied to the wire issuing from the contact device of an automatic welding head, an article of manufacture comprising flux embodied as a substantially non-deformable and preformed strip of arcuate section so that a plurality of strips disposed longitudinally of a wire may substantially encompass the latter, said strip including fluxing and binding ingredients forming a solid aggregate adhering to a fabric outer covering and conditioned for welding use.

ARTHUR R. ALLARD.